No. 677,466. Patented July 2, 1901.
J. ORTNER.
POT FOR COOKING PURPOSES.
(Application filed Jan. 28, 1901.)
(No Model.)
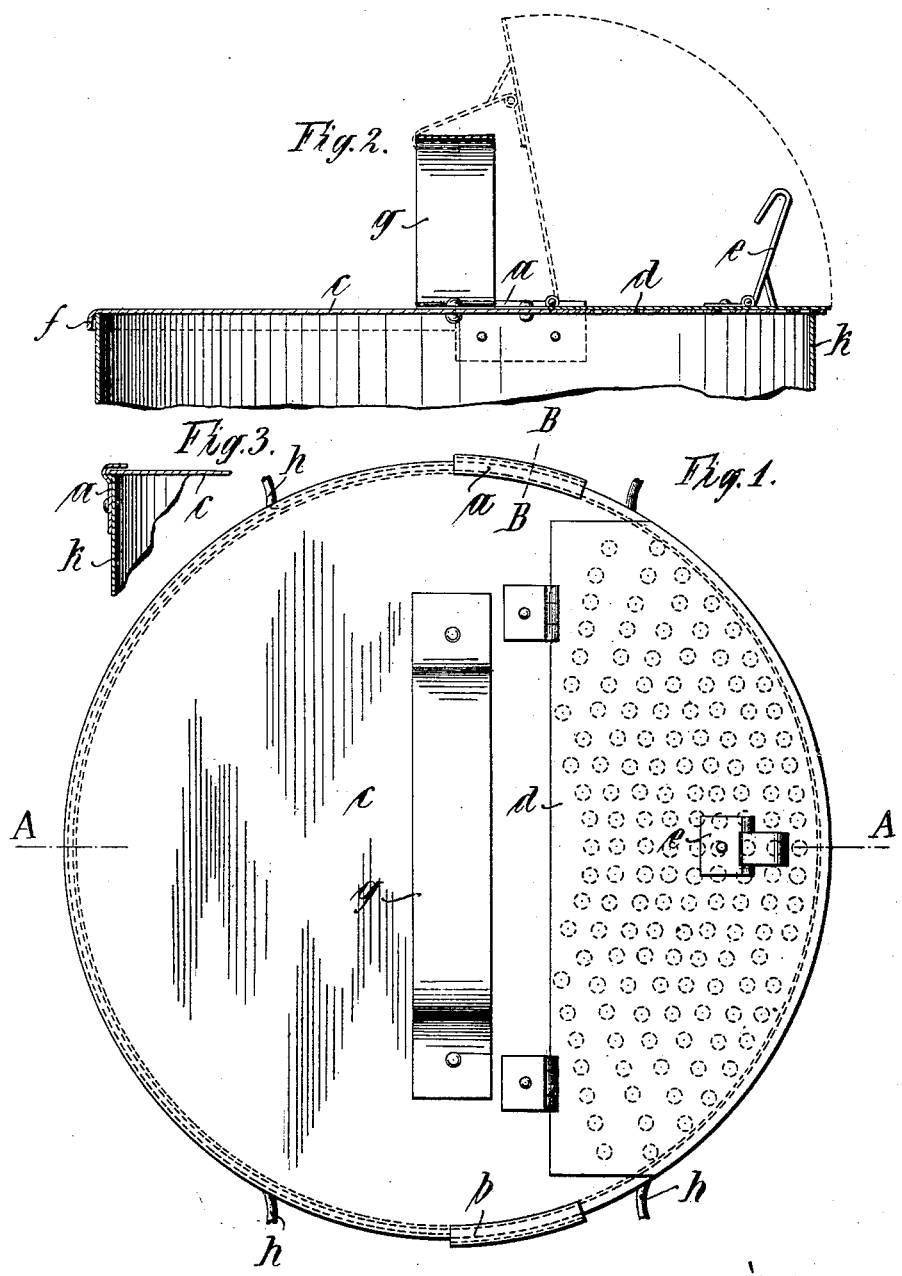
Attest,
P. M. Kelly.
Robt. M. Hunter.
Inventor
Johannes Ortner

UNITED STATES PATENT OFFICE.

JOHANNES ORTNER, OF PADERBORN, GERMANY.

POT FOR COOKING PURPOSES.

SPECIFICATION forming part of Letters Patent No. 677,466, dated July 2, 1901.

Application filed January 28, 1901. Serial No. 45,006. (No model.)

*To all whom it may concern:*

Be it known that I, JOHANNES ORTNER, a subject of the King of Prussia, German Emperor, residing at Paderborn, in the Kingdom of Prussia and German Empire, have invented certain new and useful Improvements in Pots for Cooking Purposes, of which the following is a specification.

My present invention relates to improvements in pots for cooking purposes; and the object of my improvements is to enable liquid to be poured off from the solid contents of such pots without using a separate sieve and without danger of scalding or burning by the rising steam or the heat of the pot. I attain this object by the peculiar construction of parts illustrated by way of example in the drawings, in which—

Figure 1 is a plan; Fig. 2, a section on line A A, and Fig. 3 a sectional view of a detail.

On a pot $k$ of usual construction two lugs $a\ b$ are secured by rivets or other means, their upper edge projecting inwardly over the edge of the pot. The lid or cover $c$, which when placed on the pot is pushed from the side under the upper edges of the lugs $a\ b$, consists of a circular plate of sheet metal whose edge is provided with a border $f$, extending some distance around the circumference. In the middle of this plate there is a handle $g$. The cover $c$ is perforated for a portion of its circumference, and a hinged segmental cover $d$ is provided to tightly cover the perforations. A hook $e$ is attached to the cover $d$, which when the segmental cover $d$ is opened for the purpose of straining off the liquid contents of the pot is hooked over the handle $g$.

A pot provided with my improvements is used for straining as follows: The cover $d$, which tightly closes the perforations while the contents of the pot are being cooked, is raised by means of the hook $e$, which is hooked over the handle $g$. The pot is then held by the handles $h$ (shown broken off in the drawings) and the liquid strained out through the perforations by inclining the pot. During this straining the cover cannot slip off, the pot being held by the border $f$ and the lugs $a\ b$, and the steam is prevented by the cover $d$ from rising, so as to incommodate the person holding the pot.

In no case need the hands come into contact with any hot part of the pot in handling the same.

I am aware that pots with strainers have been used before my invention; but such pots possess a number of serious drawbacks. For example, with existing pots the lid had to be removed and turned over for the purpose of straining, or, as in some other constructions, a part of the cover was left open, which is a serious drawback in cooking pulse and other things. Further, existing constructions are not provided with means to prevent the hands being scalded. All these drawbacks are overcome by my above-described invention.

What I claim, and desire to secure by Letters Patent of the United States, is—

In a pot or cooking utensil, the combination with the body of the pot, provided with fixed inwardly-projecting lugs $a\ b$ raised above and projecting over its upper rim, of the cover $c$ provided with the perforated segment and the hinged flap $d$, and having the front portion of its edge flat and adapted to rest on the upper rim of the pot and pass under the inwardly-projecting lugs $a\ b$ and having the rear portion of its edge provided with a flange or downturned rim $f$ adapted to abut against the outer face of the rim of the pot.

In testimony whereof I have hereunto set my hand in the presence of two witnesses.

JOHANNES ORTNER.

Witnesses:
 JOHANN JORDAN,
 KASPER KLEINE.